United States Patent [19]

Froeschke

[11] Patent Number: 4,559,000

[45] Date of Patent: Dec. 17, 1985

[54] APPARATUS FOR THE PRODUCTION OF GRANULATES

[75] Inventor: Reinhard Froeschke, Weinstadt, Fed. Rep. of Germany

[73] Assignee: Santrade Ltd., Lucerne, Switzerland

[21] Appl. No.: 622,192

[22] Filed: Jun. 19, 1984

[30] Foreign Application Priority Data

Jul. 29, 1983 [DE] Fed. Rep. of Germany ....... 3327479
Oct. 5, 1983 [DE] Fed. Rep. of Germany ....... 3336208

[51] Int. Cl.[4] .............................................. A61K 9/20
[52] U.S. Cl. ....................................... 425/6; 264/140; 264/141; 425/381; 425/447
[58] Field of Search ............... 425/312, 313, 315, 377, 425/6, 294, 308, 311, 314, 378 R, 331, 373, 376 B, 382 R, 447, 449, DIG. 230, 142; 264/151, 316, 141, 138, 140, 142; 156/244.11, 291

[56] References Cited

U.S. PATENT DOCUMENTS

| | | | |
|---|---|---|---|
| 1,848,332 | 3/1932 | Estes | 425/306 |
| 2,904,827 | 9/1959 | Kaiser et al. | 425/312 |
| 2,979,764 | 4/1961 | Andrew | 425/6 |
| 4,279,579 | 7/1981 | Froeschke | 425/6 |

FOREIGN PATENT DOCUMENTS 249596  1/1970  U.S.S.R. ............... 425/313

Primary Examiner—Jay H. Woo
Assistant Examiner—Jill L. Fortenberry
Attorney, Agent, or Firm—Burns, Doane, Swecker & Mathis

[57] ABSTRACT

An apparatus forms granulates from a flowable viscous mass. The mass is delivered to a tubular body and flows downwardly from a lower slit thereof in the form of drops. An endlessly revolving belt travels across the slit in tight engagement therewith. The belt has orifices therein which intermittently open the slit to admit the passage of the drops. The drops fall onto a conveyor which travels below the belt in the same direction and at the same speed as the belt.

23 Claims, 11 Drawing Figures

APPARATUS FOR THE PRODUCTION OF GRANULATES

BACKGROUND AND OBJECTS OF THE INVENTION

The invention concerns an apparatus for the production of granulates from a flowable, viscous mass which is brought into drop form and caused to solidify. The apparatus includes a vessel having a plurality of outlet orifices, which are intermittently opened or closed by covering surfaces moved periodically in front of them to periodically permit the discharge of drops of mass which is under pressure.

Apparatuses of this type are known from U.S. Pat. No. 2,979,764, for example. In the known configuration a disk is equipped with three blades, each covering a sector of 60°. The disk rotates at the bottom of a pressure vessel having a perforated bottom. By means of the rotating motion of the bladed disk, the material which initially flows from the vessel through the perforations in the form of strips, is cut into individual pieces, which then form the drops. A disadvantage is that such installations cannot be used in combination with conveyor belts passing under the masses dripping out, because non-uniform amounts of drops are formed as viewed over the cross-section of the belt, which would lead to the agglomeration of several drops.

Granulating devices equipped with rolls (e.g., see U.S. Pat. Nos. 1,848,332 and 4,279,579) have therefore been proposed, wherein drops exiting from several holes may be placed uniformly onto a support surface. In one case, however, (i.e., U.S. Pat. No. 1,848,332), the process is restricted to relatively viscous masses, while less viscous masses would run from the orifices out of control. In the other case (i.e., U.S. Pat. No. 4,279,579) this disadvantage is not encountered, but it is found that at high production velocities and relatively viscous masses, the outer rotating and perforated cylindrical body entrains part of the mass, which then drops onto the cooling conveyor or the like in the form of fine droplets, potentially leading to undesirable bonding or affecting the shape of the drops and/or their removal from the conveyor.

It is, therefore, an object of the invention to provide an apparatus for the production of granulates of the afore-described type such that even in the case of very high production rates and drop velocities, the spattering of residual droplets is avoided.

SUMMARY OF THE INVENTION

The invention involves a vessel in the form of a tubular body equipped with an outlet slit. The portion of the surface containing the slit is positioned against a perforated belt moving past the tubular body. This embodiment operates in the same manner as the known configurations by the principle of the opening and closing of outlet passages. As, however, the opening and closing member is a body moving in a planar direction, the throwing-off of residual droplets by centrifugal forces is prevented. The length of the belt available behind the tubular body may be chosen so that nearly all of the residual droplets drop off before its end. If, then, a conveyor or cooling belt is moving under the belt and parallel to it, at the same velocity, the residues remaining in the perforations can drop only onto drops already located on the conveyor, so that no undesirable and uncontrolled covering of the cooling or conveyor belt with solidifying masses takes place.

A structurally simple form is obtained when the perforated belt is an endless belt passed around two reversing drums, one or both of which are driven. The tubular body may then be arranged above a lower flight of the belt between the two reversing drums at a distance in front of the reversing drum located at an upstream end of the lower flight, so that the length of the belt will be sufficient to insure dripping of the residual mass. By means of supplemental heating devices it may be insured that residues also drop out of the belt perforations.

The tension of the belt may be adjustable by known means. The external surface of the tubular body cooperating with the belt projects slightly downwardly past a plane tangent to the two reversing drums so that a secure and tight application of the belt against the slit of the tubular body may be obtained. It is then also possible, provided that the perforated belt is moving at the same velocity as a conveyor or cooling belt running below it, to place several tubular bodies inside the perforated belt, as the drops extruded at a later location will drop onto parts of drops already located therebelow. Appropriately, the external surface of the tubular body in contact with the belt is curved on either side of the slit to extend away from the belt. The tubular body may be equipped with an internal conduit for receiving the mass to be dripped. Transverse bore holes are arranged in a row and communicate with the internal conduit at one end and with the slit at the other end. The tubular body may further be provided with heating or cooling elements which make certain that the material to be dripped is heated to the desired viscosity during the formation of drops. Lateral guides may be provided to confine the product from traveling laterally off the belt. In order to obtain a cleansing of the perforated belt during its revolution, the two reversing drums may be heated and/or along the upper flight thereof thermal radiators or the like may be provided to force the dripping of the residual material still remaining in the perforations. It is also possible to place the entire belt, including the tubular body, in a suitably heated housing.

In an apparatus of this type the mass to be dripped is pressed-out through the lower flight of the belt. As this endless belt and a conveyor or cooling belt conducted under it are moving in the same direction, and preferably, at the same velocity, the residual droplets dropping from the perforated orifices in the course of the movement of the belt do not lead to an uncontrolled splattering of the cooling or conveyor belt. Rather, the residual material that is dripping down is dropping onto drops already in existence.

It has been found, however, that even by means of supplemental heating devices, it is not entirely possible to free the perforated orifices completely of residual material in the course of a revolution of the belt. In the orifices and/or on the outside of the revolving perforated belt, a residue of the liquid viscous material may remain which can lead to interference with the drop forming process that recommences after the revolution of a row of perforated orifices.

Accordingly, along the upper flight of the belt a wall is provided which extends transversely and presses residual material from the outside of the belt through the perforations. The material present on the outside is therefore necessarily forced into the perforations and thus moves to the inside of the revolving belt, from where it may be returned to the recommencing drop forming process. The wall seated on the top side of the upper flight of the belt comprises a pair of angled legs opening funnel-like against the direction of the motion of the belt. These legs thus collect all of the material still adhering to the outside of the belt, and conduct it to a location over the center line of the belt where it is pressed through the perforations. For that purpose it is sufficient to provide flat legs inclined relative to each other.

In a further modification the legs can be oriented at an acute angle relative to the belt surface to create a spatula effect, whereby the dammed-up material is pressed through the perforations at considerable force. The damming and spatula surfaces are placed adjacent the reversing drum located at an upstream end of the upper flight of the conveyor, so that the material being pressed is given sufficient time to drip down under the effect of, for example, a supplemental heating. It is further possible to provide a scraper edge acting on the inner side of the upper flight in the area of the downstream drum. The scraper extends transversely and contributes mechanically to the removal of the material pressed inwardly by the wall and forces it onto the lower flight. The scraper edge appropriate comprises the upper edge of a drip wall located upstream of the annular body so that the material scraped-off and transported downwardly thus arrives on the lower flight in front of the location where dripping originates and is pressed together with the new material downwardly in the form of drops.

As much material may be pressed through the belt by the wall, it is advantageous to equip the drip wall at its lower edge with a collecting gutter for collecting the material running down the wall. The material collected in the gutter will be fed uniformly onto the lower belt strand in the manner of an overflow weir.

THE DRAWING

The objects and advantages of the invention will become apparent from the following detailed description of preferred embodiments thereof, in connection with the accompanying drawings, in which like numerals designate like elements, and in which.

DETAILED DESCRIPTION OF PREFERRED EMBODIMENTS OF THE INVENTION

Figure 1:
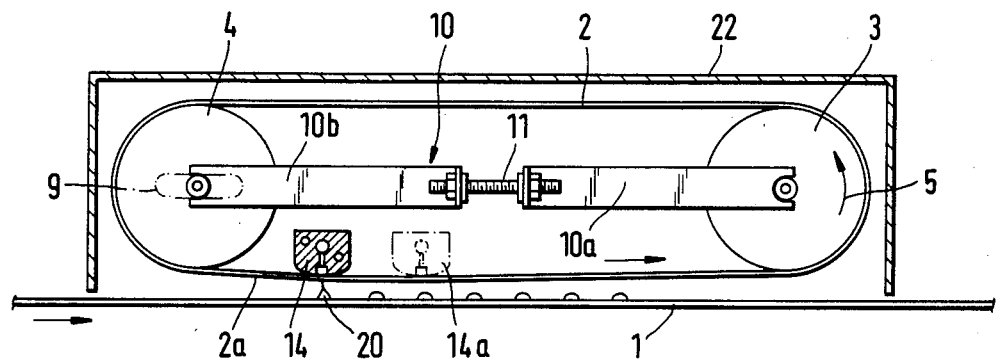
FIG. 1 shows a schematic side elevational view of a novel apparatus for the granulation of solidifying masses according to the present invention.
Figure 2:
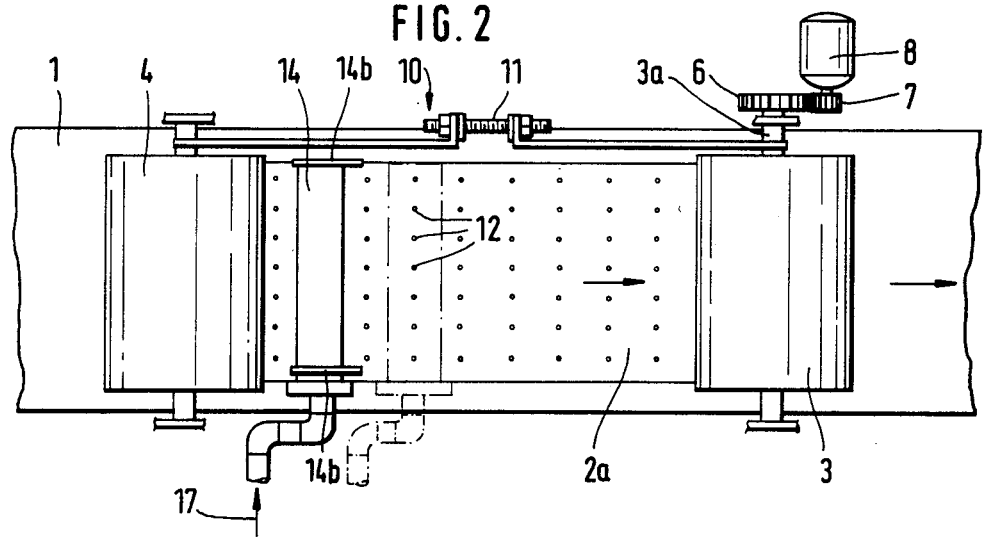
FIG. 2 is a schematic top plan view of the apparatus of FIG. 1 with an outer housing removed.
Figure 3:
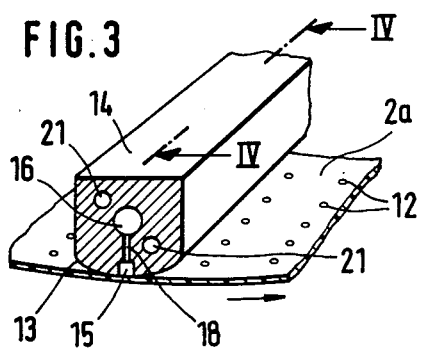
FIG. 3 is an enlarged and perspective detailed view of a tubular body for the dripping process of FIG. 1, with a perforated belt guided therebeneath.
Figure 4:
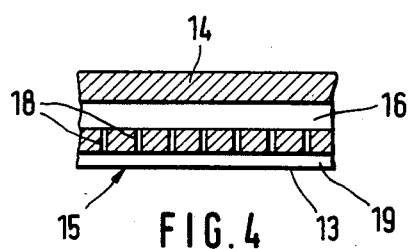
FIG. 4 is a partial section through the tubular body of FIG. 3 along the line IV—IV.

In FIGS. 1 and 2, there is depicted an endless, revolving belt 2 conducted over a conveyor 1 around two reversing drums 3 and 4 which are rotatably supported by standard bearings (not shown in detail), for example, in a support stand. The reversing drum 3 is driven in the direction of the arrow 5. Drive is effected by an extension of a shaft 3a being equipped with a tooth gear 6, the latter being driven by means of a pinion 7 and an electric motor 8 or other suitable drive motor. The two reversing drums 3 and 4 are rotatably supported in a support frame (not shown), in such manner that their mutual distance of spacing may be adjusted to a certain extent. For this purpose, the reversing drum 4 is held in an elongated slot 9 indicated by a broken line in FIG. 1, with the distance between the two reversing drums 3 and 4 being adjusted by means of a spacer 10, which may comprise part of the support stand. The length of the spacer 10, comprised of parts 10a and 10b may be varied, for example, by means of threaded bolts 11. Spacers 10 are provided on both sides of the reversing drums 3 and 4. In FIG. 2, on the other hand, one of the spacers 10 has been eliminated for clarity. By varying the distance between the reversing drums 3 and 4, the tension of the belt 2 may be adjusted. The belt may comprise, for example, a synthetic plastic belt, preferably made of PVC, and perforated with a plurality of orifices 12. The lower flight 2a of this PVC belt, as seen in FIG. 2 wherein the upper flight is not shown, has its inner side resting against a curved outer surface 13 of a vessel in the form of a tubular body 14 (see FIG. 3). The body 14 has on its outer surface 13 (facing the lower flight 2a) a slit 15 extending transversely relative to the travel direction of the belt 2. The slit is closed by the solid portion of the tightly fitting perforated belt 2, but is opened when a row of orifices 12 is aligned therewith. The tubular body 14 is being supported fixedly over the conveyor 1, for example in a support stand (not shown in FIGS. 1 and 2).

The tubular body 14 has an internal guide channel 16 for a viscous and flowable mass, introduced in the direction of the arrow 17 (FIG. 2) in a flowable state under pressure. Extending from the guide channel 16 are a plurality of transverse bore-type apertures 18. The bores 18 open into a groove 19 toward the outer surface 13 to define the slit 15. When the guide channel 16 is supplied with the material to be dripped under pressure, the material passes into the groove 19 through the transverse bores 18, in a uniform distribution over the width of the groove 19 as a result of the transverse bores 18 acting as choke bores. From here, the material drips in individual drops 20 down onto the conveyor 1, which for example may be a cooling belt causing the material arriving in a hot state on its surface to solidify into small, lens-shaped bodies.

Preferably, the surface 13 of the tubular body 14a extends below a plane extending tangently to the lower sides of the drums to maximize the frictional engagement between the belt 2 and the surface 13.

In order to maintain the temperature of the mass to be dripped in the tubular body 14, there are provided, parallel to the guide channel 16, a plurality of flow channels 21 wherein a temperature controlled thermal oil is flowing. It is obviously also possible to replace these flow channels, for example, by electric heating elements. In order to prevent the product mass exiting laterally between the tubular body 14 and the belt 2 from running laterally off the belt 2, the tubular body 14 is equipped with guides 14b in the form of radially projecting ribs, which confine the product to the inner surface of the belt and onto the perforated orifices 12.

The endless belt 2 is surrounded, as can be seen in FIG. 1, by a housing 22 wherein a temperature may be maintained, assuring the flowability and thus the dripping ability of the material to be processed.

FIG. 1 further shows that the tubular body 14, which as explained later herein may be supplemented by one or more additional tubular bodies 14a (see broken lines in FIGS. 1, 2), is placed in the area of the reversing drum 4 (oriented closely upstream of the tubular body 14), so that the perforations 12 of the lower flight 2a must travel a long distance parallel to the conveyor 2, prior to arriving on the reversing drum 3. Any residual material still suspended in the orifices 12 and not dripping down, is thus given an opportunity to fall on the way from the tubular body 14 to the reversing drum 3. In order to insure that these residual drops do not impact the conveyor 1 in an uncontrolled manner, the velocity of the belt 2 is identical with that of the conveyor 1. This means that residual drops from the perforated orifices 12 over the entire path of the upper flight 2a from the tubular body 14 to the reversing drum 3 are always falling on larger drops already there and coagulate with them to form somewhat larger drops. There is, therefore, no undesirable splatterings on the conveyor 1. Thus, when the belt 2 reverses direction around the reversing drum 3, the orifices will have been already cleaned to a great extent, so that little or no material is thrown-off by centrifugal force. This enables the belt 2 to be run at a relatively high velocity so that the apparatus has a very high production capacity with low viscosity masses.

Figure 5:
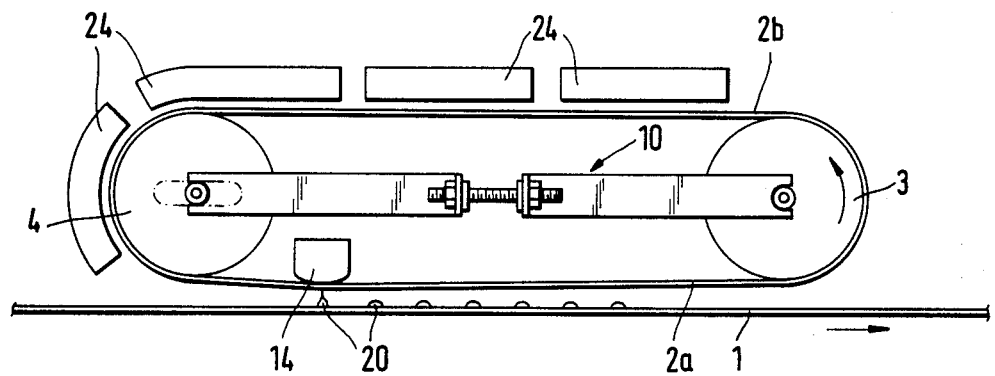
FIG. 5 is a schematic side elevational view of another embodiment of the invention.

An embodiment depicted in FIGS. 5 to 7 displays in principle the same concept as the drop forming installation described in connection with FIG. 1. Here, however, infrared radiators 24 or the like are provided in the area of the upper flight 2b of the belt 2 whereby due to intensive heating any remaining residual material is removed from the orifices 12, prior to their return to the tubular body 14.

Figure 6:
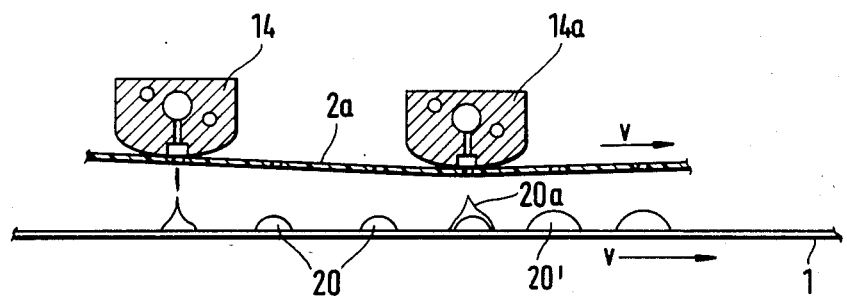
FIG. 6 is an enlarged detailed view of the dripping process from tubular bodies located successively to each other above a revolving belt.
Figure 7:
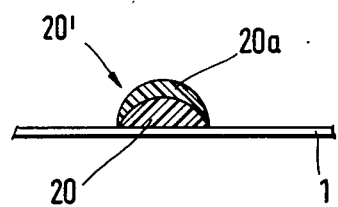
FIG. 7 is a schematic view of the cross-section of a solidifying drop formed by the apparatus according to FIG. 6.

If as depicted in FIG. 6, the tubular body 14 is followed by a second body 14a, the throughput of the material to be processed may be increased. In this case, again, the drops 20a exiting from the second tubular body 14a are dropping onto the drops 20 dripped from the first tubular body 14 and are combining with them to form larger drops 20', which depending on viscosity, have the configuration of spherical sections of varying height. The drops solidify in that shape when transported by the conveyor 1 which travels through a cooling tunnel or is in the form of a cooling belt (consisting for example of steel) sprayed from the bottom with a cooling solution. This cooling action begins downstream of the area of the dropforming installation. The drops 20a from the second tubular body 14a combine with the drops 20, as do any residual drops from the perforated orifices 12, since the velocity of the belt 2 and of the conveyor 1 moving parallel to it are identical.

Figure 8:
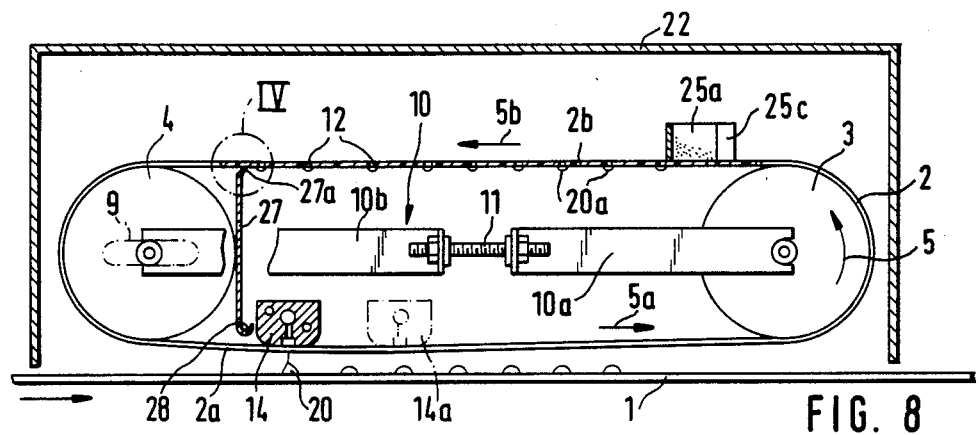
FIG. 8 is a schematic side elevational view of another embodiment of the invention.
Figure 9:
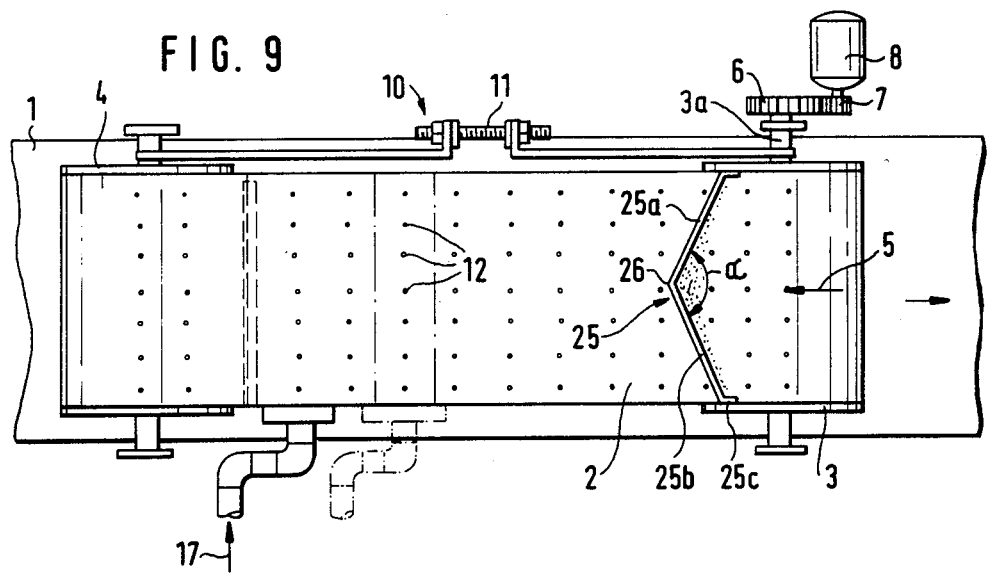
FIG. 9 is a schematic top plan view of the apparatus of FIG. 8, with an outer housing removed.
Figure 11:
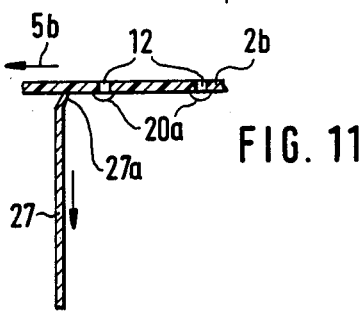
FIG. 11 is an enlarged side view of a scraper blade depicted in FIG. 8.

In FIGS. 8, 9 there is depicted a modification of the apparatus described in connection with FIGS. 1-4. The parts referenced by the same reference numerals in FIGS. 1-4 and 8-9 are identical. In FIGS. 8, 9 there is further depicted means which assures that, during the course of the drop forming process, the material still adhering to the outside of the revolving belt 2 is removed before it is able to interfere with the novel process of drop formation. In that regard, there is provided on the upper side of the upper flight 2b of the belt 2 a damming wall 25. The wall 25 extends transversely of the travel direction of the belt 2 and comprises two legs 25a and 25b, which are angled relative to each other at an obtuse angle $\alpha$ opening in a direction opposite the running direction 5 of the belt, thereby defining a funnel which is approached by the belt. Terminal ends 25c of the legs are bent to lie over the two outer edges of the belt 2. The apex 26 of the angle $\alpha$ lies over the center of the belt. The arrangement of the wall legs 25a and 25b is thus symmetrical with respect to the center of the belt 2. The lower edges of the wall legs 25a and 25b rest firmly against the top side of the upper flight 2b of the belt so that any material still adhering to the outer side of the belt 2 collects within the funnel-shaped damming wall 25, particularly to a location over the center line of the belt. This material is forced by this damming process downwardly through the orifices 12 in the upper flight 2b and then either drops onto the lower flight 2a or remains in the form of drops 20a on the bottom side of the upper flight 2b. In order to safely remove these drops 20a or any other material adhering to the inner side prior to reaching the reversing drum 4, there is provided a drip wall 27 inside the revolving belt 2 in the area of the reversing drum 4. The drip wall 27 extends transversely across the width of the belt 2 and possesses a scraper edge 27a, which (as seen particularly in FIG. 11) may be oriented to oppose the running direction 5b of the upper flight 2b. Thus, the drops 20a or any other materials still adhering to the bottom side of the upper drum 27, are conducted downwardly, prior to reaching the reversing drum 4. The material running downwardly then arrives in a collecting gutter 28 located at the bottom edge of the drip wall 27. The gutter 28 functions as an overflow weir whereby the residual material that accumulates therein is distributed uniformly onto and across the width of the lower flight 2a, in front of the first tubular body 14. The tubular body 14 causes this residual material, together with new material, to be formed into drops 20 which then drop onto the conveyor 1.

Figure 10:
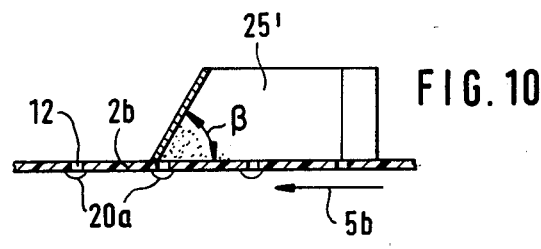
FIG. 10 is an enlarged cross-sectional view of a second form of a damming wall.

FIG. 10 shows a modification of the damming wall. The damming wall 25' of FIG. 10 is inclined at an acute angle $\beta$ with respect to the surface of the upper flight 2b of the belt 2. The damming wall 25' is flexible, e.g., comprises a flat belt piece. This orientation of the wall 25' causes the wall 25' to act as a spatula to effect downward pressing of the damming wall on the material collecting at the wall. It would also be possible to design the damming wall 25' as a wall curving in a concave manner against the running direction 5b of the upper flight, which would then have a tangent extending at an acute angle to the surface of the upper flight 2b. The configuration shown is, however, significantly simpler and as efficient. It is not absolutely necessary for the damming wall to comprise two flat legs converging to an apex 26; the wall may also be curved. But even then, it should open in the shape of a funnel against the running direction 5b on the upper flight, so that the dammed-up material is collected and not deflected laterally from the belt.

Although the present invention has been described in connection with preferred embodiments thereof, it will be appreciated by those skilled in the art that modifications, additions, substitutions, and deletions not specifically described may be made without departing from the spirit and scope of the invention as defined in the appended claims.

What is claimed is:

1. An apparatus for the formation of grantulates from a flowable, viscous mass, comprising:
   a tubular body having a plurality of apertures which lead into a generally downwardly facing, horizontally continuous slit,
   means for conducting the flowable viscous mass under pressure into said body and outwardly through said apertures and said slit,
   a pair of rotatable drums spaced apart horizontally and rotatable about horizontal axes,
   a belt extending around said drums to define upper and lower belt flights, said belt having orifices therein and being arranged so that said lower flight is horizontal and arranged in contacting engagement with a surface portion of said tubular body containing said slit,
   means for driving at least one of said drums for moving said lower flight across said portion of said tubular body so that said orifices intermittently uncover said slit for the passage of drops of mass therethrough,
   said tubular body being positioned so that said slit is located closer to the one of said drums which is upstream relative to the direction of travel of said lower flight,
   a conveyor located beneath said lower flight and arranged for movement in the same direction as said lower flight, so that the drops fall onto said conveyor, and
   means for moving said conveyor at the same speed as said lower flight.

2. Apparatus according to claim 1 including means for adjusting said belt, said surface of said belt extending beyond a plane disposed tangently to said drums.

3. Apparatus according to claim 1, wherein there are provided a plurality of said tubular bodies in contact with said belt.

4. Apparatus according to claim 1, wherein said belt is formed of synthetic plastic.

5. Apparatus according to claim 4, wherein said plastic comprises reinforced PVC.

6. Apparatus according to claim 1, wherein said surface portion comprises part of a surface the remaining parts of which project away from said belt on opposite sides of said slit.

7. Apparatus according to claim 1, wherein said tubular body comprises an internal guide channel for receiving the mass to be formed into drops, said apertures comprising a plurality of transverse bores extending downwardly from said channel and communicating with said slit.

8. Apparatus according to claim 7, wherein a plurality of flow channels extend parallel to said guide channel and contain a heated medium for controlling the temperature of the mass within said tubular body.

9. Apparatus according to claim 1, wherein said tubular body includes guides at opposite ends thereof to confine the exiting mass against flowing laterally off said belt.

10. Apparatus according to claim 1 including a housing containing said belt and said tubular body, the inside of said housing being temperature controlled.

11. Apparatus according to claim 1 including thermal radiators disposed for heating an upper flight of said belt and the one of said drums located at a downstream end of said upper flight.

12. Apparatus according to claim, 1, wherein a heated medium is conducted through both of said drums.

13. Apparatus according to claim 1, wherein a transverse wall is positioned against an outer side of an upper flight of said belt to force material still adhering to such outer side of the belt through said orifices.

14. Apparatus according to claim 13, wherein said wall is funnel-shaped, with a wide end thereof facing opposite the direction of belt travel.

15. Apparatus according to claim 13, wherein said wall includes a pair of legs forming an angle therebetween to define the funnel-shape.

16. Apparatus according to claim 15, wherein said angle is obtuse.

17. Apparatus according to claim 15, wherein said legs form an apex located over the center line of said belt, both said legs being symmetrical relative to such center line.

18. Apparatus according to claim 15, wherein said legs are inclined at an acute angle relative to the plane of said belt, said angle opening in a direction opposite the direction of belt travel.

19. Apparatus according to claim 17, wherein said legs are each planar.

20. Apparatus according to claim 13, wherein said wall is arranged closer to the one of said drums located at an upstream end of said upper flight.

21. Apparatus according to claim 13, wherein a scraper edge is situated adjacent the one of said drums located at a downstream end of said upper flight, said scraper edge acting on an inner side of said upper flight and extending transversely to the direction of belt travel.

22. Apparatus according to claim 21, wherein said scraper edge comprises the upper edge of a drip wall which is located upstream of said tubular body.

23. Apparatus according to claim 21, wherein said drip wall includes at its lower edge a collecting gutter for collecting material running down said drip wall.

* * * * *